United States Patent

[11] 3,604,495

| [72] | Inventor | Franck M. Picker |
| | | Oak Ridge, Tenn. |
| [21] | Appl. No. | 882,020 |
| [22] | Filed | Dec. 4, 1969 |
| [45] | Patented | Sept. 14, 1971 |
| [73] | Assignee | Pic-Air Inc. |
| | | Oak Ridge, Tenn. |

[54] METHOD OF MAINTAINING DIECASTING RECIPROCATION APPARATUS IN FORCE-BALANCED STATE
1 Claim, 5 Drawing Figs.

[52] U.S. Cl. .................................................. 164/113, 18/30 LV, 18/30 CK, 164/303
[51] Int. Cl. ...................................................... B22d 27/10
[50] Field of Search ........................................... 164/113, 120, 303; 18/30 CK, 30 LM, 30 LV

[56] References Cited
UNITED STATES PATENTS

| 1,981,380 | 11/1934 | Wagner................... | 164/153 |
| 2,356,338 | 8/1944 | Misfeldt.................. | 164/120 |

FOREIGN PATENTS

| 895,053 | 4/1962 | Great Britain................ | 18/30 LM |
| 6,710,876 | 5/1968 | Netherlands................. | 164/303 |
| 417,064 | 1/1967 | Switzerland................. | 18/30 LM |

*Primary Examiner*—R. Spencer Annear
*Attorney*—Paul E. Hodges

ABSTRACT: In a method for diecasting molten metal employing a split die, one platen of which is fixed and one platen of which is reciprocatable between open and closed positions, the improved step of maintaining the platen reciprocation apparatus in a force-balanced state during a major part of such reciprocation cycle.

PATENTED SEP 14 1971
3,604,495
SHEET 1 OF 4
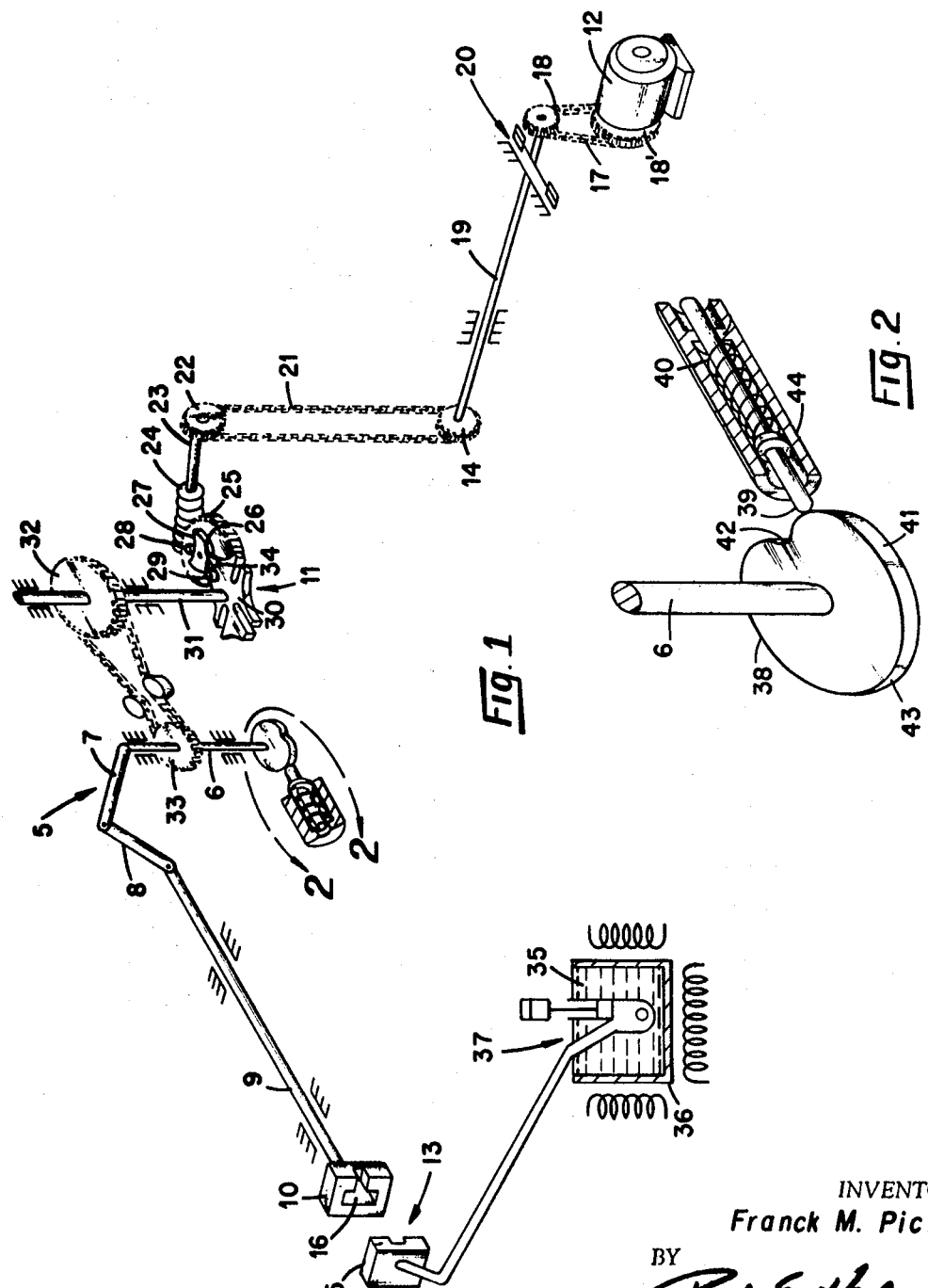
INVENTOR.
Franck M. Picker
BY
*Paul E. Hodgson*
ATTORNEY.

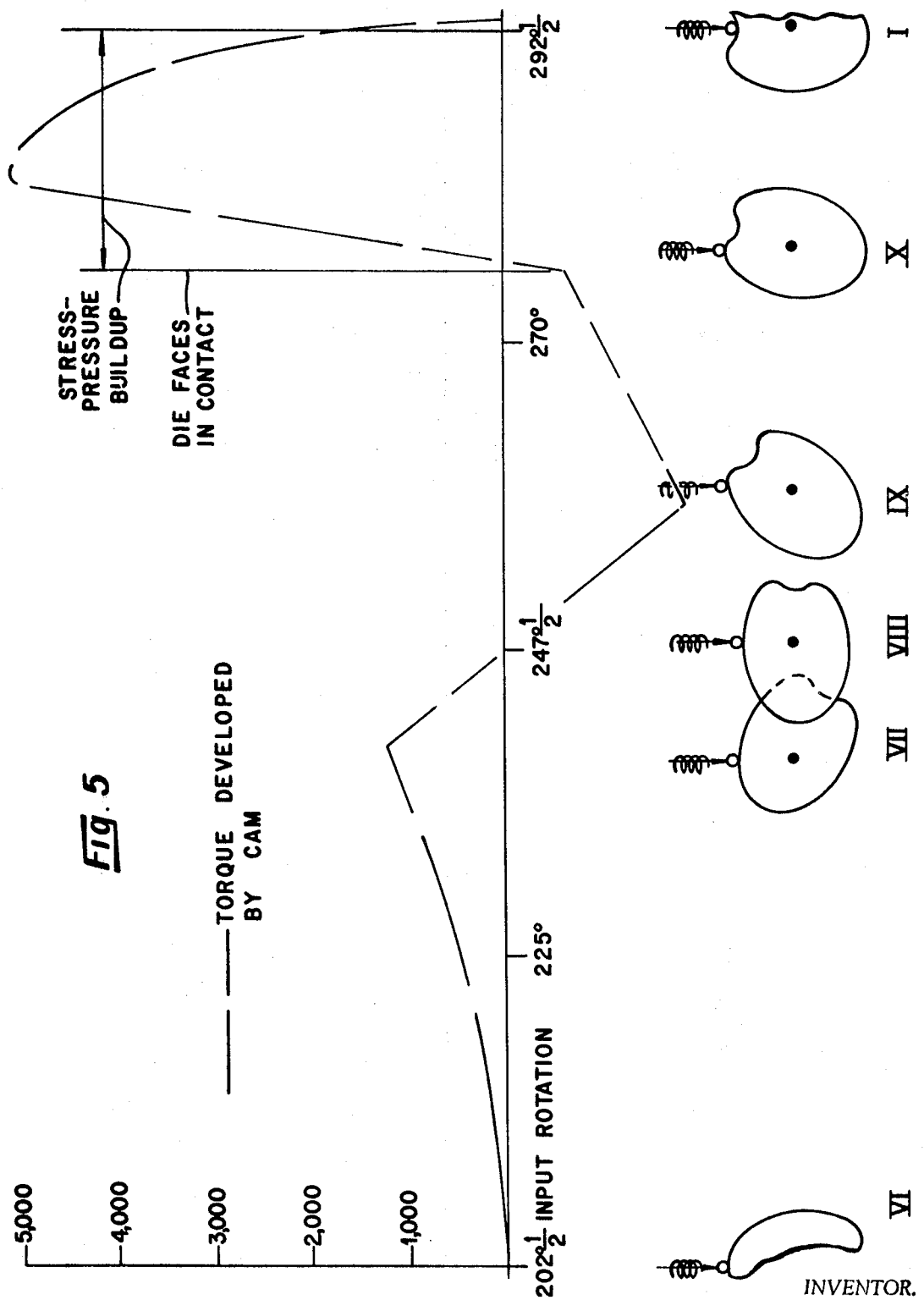

METHOD OF MAINTAINING DIECASTING RECIPROCATION APPARATUS IN FORCE-BALANCED STATE

This invention relates generally to diecasting employing the method of injecting molten metal, under pressure, into a die cavity defined by closed die platens.

Rapidity and repeatability are two major concerns in the field of diecasting. Manufacturing economics, enhanced by employing diecasting, clearly, are further enhanced by *fast* diecasting operations. The prior art diecasting technology suffers the lack of fast diecasting techniques, and apparatus which will withstand repeated use over extended periods of time. For example, prior to the present invention, a diecasting machine capable of performing six to 10 acceptable casting cycles per minute over extended periods was deemed extraordinary as respects speed of casting. Fatigue and component wear under the relatively large die reciprocation forces and stresses routinely incurred, and multitudinous die openings and closings, accounted for a large portion of the prior art apparatus failures.

In diecasting methods employing a die platen movable between open and closed positions, apparatus is required to move the die platen rapidly and repetitively along a reciprocation path. In such a method the die platen must reverse its direction at least twice during a casting cycle. Also, the die must remain stationary in the closed position for a time sufficient to permit solidification of the metal in the die cavity. Consequently, the apparatus which moves the die platen is, during a casting cycle, subjected to the forces and stresses attending movement of the die platen toward a closed position, followed by a greatly increased force and stress as a large die-closed holding pressure is applied, followed by a relaxation of the die-closed holding pressure, and "reversed" forces and stresses attending movement of the die platen toward an open position. This cyclic stressing of the apparatus results in frequent failure of the apparatus which reciprocates the die platen, such failure occurring even more quickly as the frequency of die platen reciprocation increases.

The large die-closing pressures present in diecasting molten metal have heretofore dictated the necessity of massive components in the drive train and/or other portions of the diecasting apparatus. Massive machine components possess great inertia. Accordingly, powerful prime movers were required and great forces and stresses were developed within the die platen reciprocation apparatus when these components were placed into motion, accelerated and stopped. In fast diecasting these forces and accompanying stresses reach enormous proportions which contribute to early failure of the die platen reciprocation apparatus. Further, due to their great inertia, the massive components of prior art platen reciprocation apparatus were not subject to fine control. Additionally, the prior art prime movers were of great capacity, hence very expensive.

It is therefore an object of this invention to provide a method and apparatus for fast repetitive diecasting wherein the useful life of the die platen reciprocation apparatus is extended, and improved control over the process is obtained. It is another object to provide a method for rapid diecasting wherein the die platen reciprocation apparatus is maintained in a substantially force-balanced state during a major portion of a casting cycle.

For present purposes, the discussion herein will be restricted to diecasting metal, but it is not intended to so limit the invention. It will be recognized by those skilled in the art of diecasting that the present concepts are useful in casting metals, alloys, plastics, and/or other materials, substances, etc.

FIG. 1 is a representation of one die casting apparatus for carrying out the method of the present invention.

FIG. 2 is a representation of a cam, cam follower and associated spring of the present invention and depicting their physical relationship to the mechanism employed to reciprocate the movable die platen.

FIG. 5 is an expanded graphic representation of that portion of the casting cycle of FIG. 3 which occurs between 202½° and 292½° and depicting the torque output and several corresponding rotational positions of the cam of the present invention.

Figure 3:
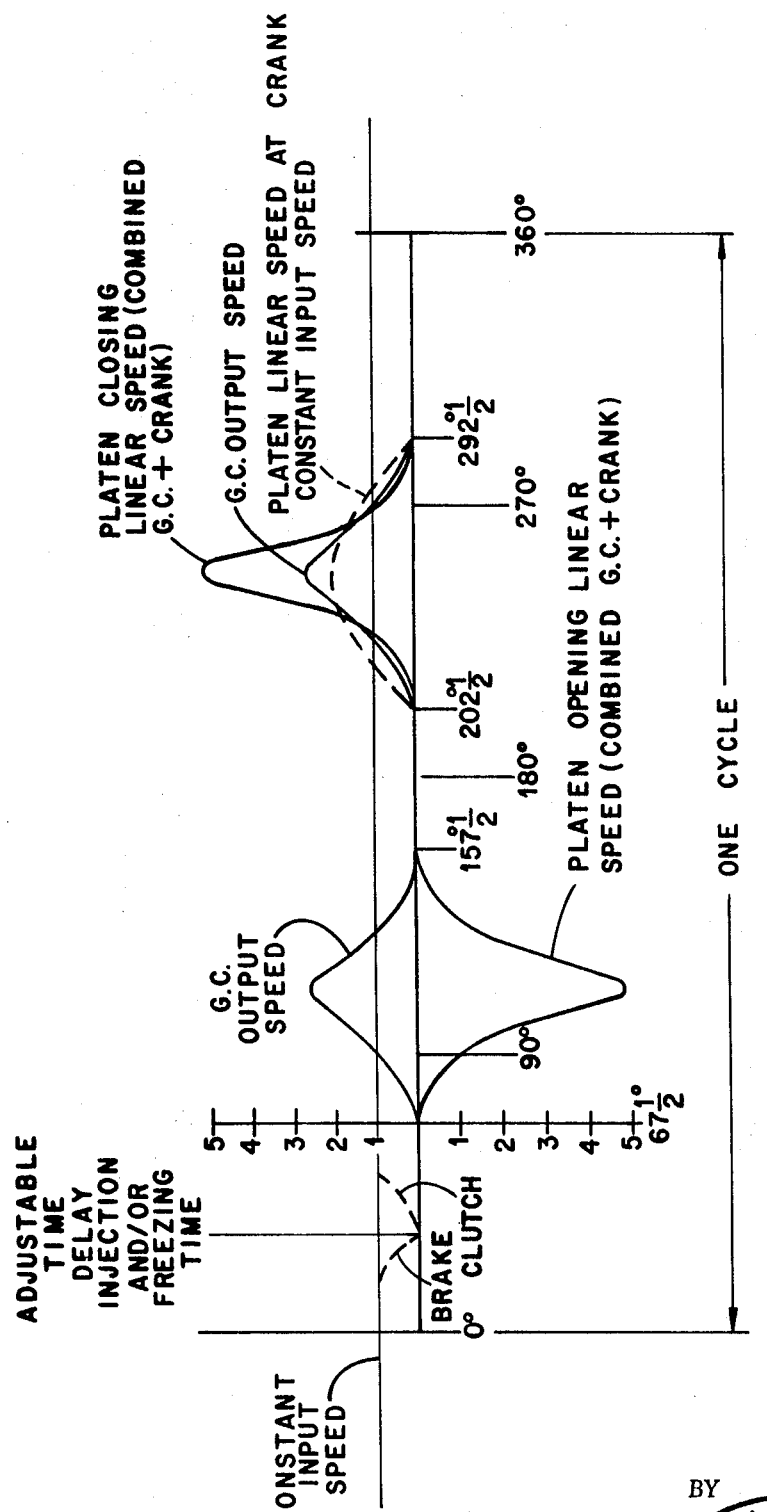
FIG. 3 is a graphic representation of one casting cycle and depicting the preferred cyclic positions of certain apparatus functions and their relative magnitudes.

In accordance with the present invention, it has been discovered that the die platen reciprocation apparatus of a diecasting machine can be maintained under conditions of balanced force and stress through the use of a combination including a cam secured to a shaft disposed within and being an element of the die reciprocation apparatus, and a spring-loaded cam follower riding against the cam surface such that rotation of said shaft and the cam causes preselected transfer of energy from the die platen reciprocation apparatus to the spring of the cam follower and subsequent transfer of the energy from the spring back to the reciprocation apparatus. It is important for reasons which will appear hereinafter that the energy transfers be programmed and not allowed to occur in an unordered manner.

It has been found that selective compression of the spring associated with the cam follower provides a means for controlling the magnitude of energy accumulation and dispensation. Only that quantity of energy is accumulated which is excess in the system. This energy is dispensed only when such serves a useful purpose in the overall scheme of the apparatus functioning.

A preferred physical arrangement of the cam-follower mechanism is shown in FIGS. 1 and 2 wherein there is provided a shaft 6 with a cam 38 keyed to and rotatable therewith. As provided for in the present invention, shaft 6, by virtue of its position in the reciprocation apparatus, experiences, as a torque force impressed thereupon, any force or stress present in the die reciprocation apparatus directed toward movement of the movable die platen 10 toward either an open or closed position. Consequently, it has been found possible to manipulate the torque forces experienced by shaft 6 in a manner so as, at all times during a casting cycle, to impose on such shaft a countertorque force by means of cam 38 and its spring loaded follower 39, which is slidably mounted as by cylindrical housing 44. That is, in accordance with the present concepts, spring 40 is cyclically compressed and expanded, hence the torque experienced by shaft 6 is controlled in accordance with a planned program selected to develop torque values which are opposite in direction but of approximately equal magnitude as the torque values impressed upon the shaft by the die platen reciprocation apparatus during a casting cycle. Accordingly, at all times during a casting cycle, the present invention provides a proper force to shaft 6 which will balance the cumulative force ahead of the shaft (toward the die 13) against the cumulative force behind the shaft (toward the prime mover 12), thereby achieving a system which is balanced with respect to force.

It is important to note that the present invention provides for full utilization of both the force provided by the prime mover and the several other forces and mechanical advantages associated with opening and closing the die platen. Such use of these forces is accomplished while at the same time the heretofore expected wear and tear of the mechanical apparatus and superstructure is substantially minimized. Still further, all the while, the total system functions at a faster cycling rate than the prior art. Speaking generally therefore, the present invention provides a diecasting method and apparatus wherein the apparatus functions faster, longer and at less prime moving force than heretofore has been possible.

The advantages provided by the present invention are myriad. Aside from the aforementioned large decrease in wear and tear, this invention makes it possible to construct less massive casting apparatus components thereby decreasing the initial cost of fabricating a diecasting machine. Because the apparatus is balanced, less prime-moving power is required, for example it has been found satisfactory to utilize a 5-hp. motor as the prime mover under circumstances which in the prior art required a 50-hp. motor.

Very importantly and contra to the prior art, the balanced apparatus of the present invention is amenable to fine control. This factor is of significance in that fine control permits the elimination of lost time between steps of a casting cycle, thus minimizing the total cycle time and significantly increasing the productive output of a given machine. In addition, accurate control of the timing of cycle steps reduces defective castings due to irregular apparatus functioning, with resultant economic savings.

In one preferred embodiment of the present invention, shaft 6 is provided with a cam having the configuration depicted in FIG. 2. The tension on spring 40 retaining the cam follower 39 against the circumference 41 of cam 38 is adjusted so as to provide an optimum constant force base, specific for individual machines and desired casting cycles. From a knowledge of the casting cycle and the forces developed in the course of such cycle, an appropriate contour is determined and provided on cam 38.

Figure 4:
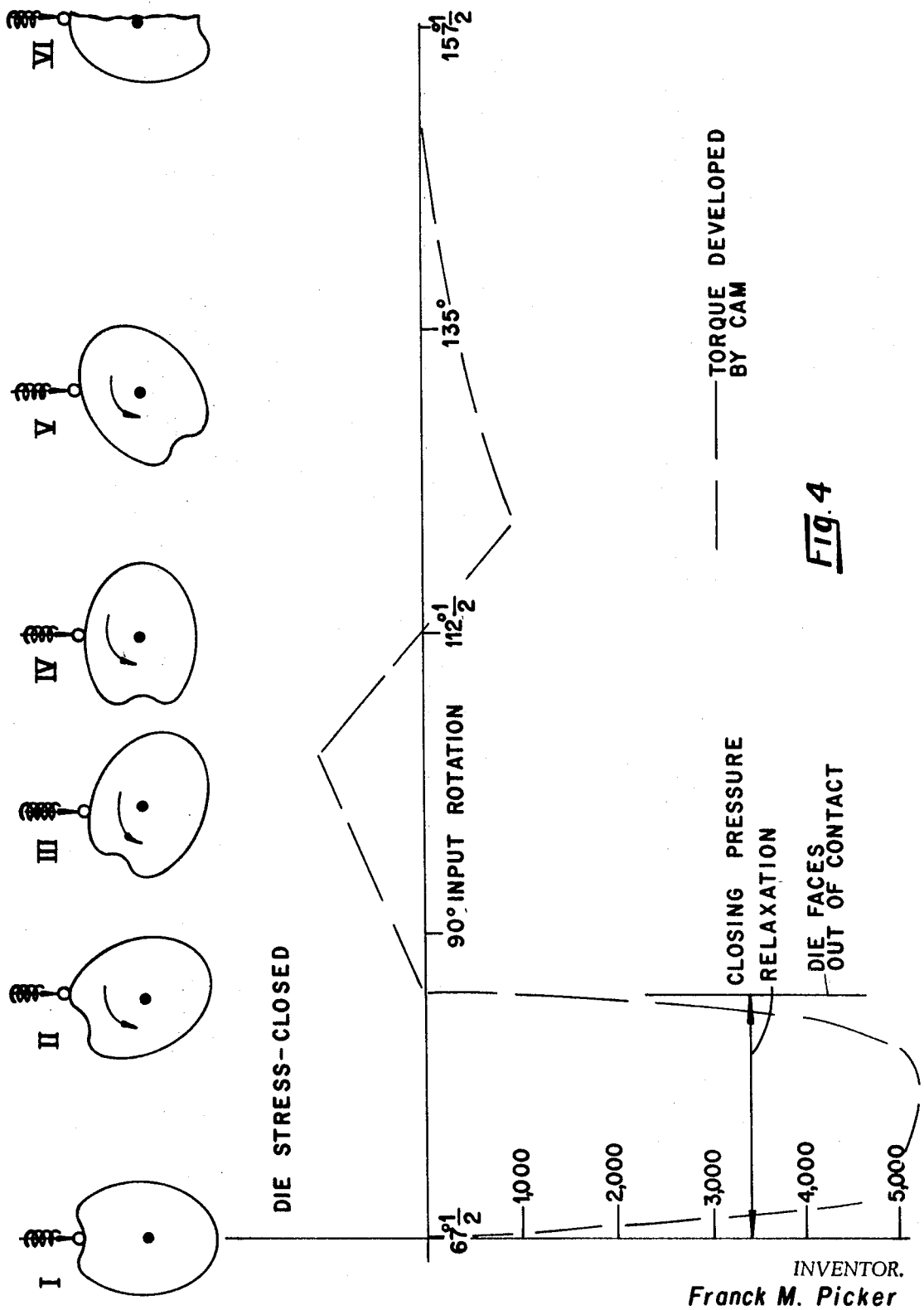
FIG. 4 is an expanded graphic representation of that portion of the casting cycle of FIG. 3 which occurs between 67½° and 157½° and depicting the torque output and several corresponding rotational positions of the cam of the present invention.

Referring to FIGS. 4 and 5, the rotational attitudes of the cam at several points during a casting cycle are depicted, commencing with the die stressed-closed at the left of the FIG. 4. In any given casting cycle employing the present invention, the movable die platen 10 is moved from an open position to a closed position (the closed position being defined as the point in the cycle where the two die platens contact without significant concomitant stress of the platen or their supporting superstructure), the platens and their supporting superstructure are then forced into a stressed state (termed the stressed-closed position for purposes of this disclosure), the molten metal is injected into the die cavity and allowed to solidify, the closing stress on the die is relaxed, and the movable die platen is moved to an open position to permit extraction of the casting, thereby completing a cycle. The movable die platen preferably is moved rapidly and without stopping or interruption from its stress-closed position, through its closed position, through its open position, through its closed position, and return to its stress-closed position. The amount of time consumed in moving the die platen thusly is determinative in a large part of the total casting-cycle time. The die usually remains stress-closed for a fixed time, such time being the time required to inject the molten metal into the die cavity plus the time required for solidification of the metal to a self-supporting state. It will be recognized that in a preferred mode of cycling the reciprocation apparatus for the movable die platen will be active at all times during a cycle except when the die is in its stressed-closed position. When the die is in the latter position, the die reciprocation apparatus may be deactivated for that period of time during which the die remains stressed-closed.

From the foregoing discussion, it will be noted that the reciprocation apparatus for the movable die platen undergoes severe changes in load during a single casting cycle. Specifically, assuming a die-open starting position, the reciprocation apparatus starts a cycle with a zero load, i.e. no force or stress is imposed thereupon. The load of die reciprocation in a positive direction (acceleration) is then immediately placed on the apparatus, such load increasing to a maximum at the midpoint between open and closed positions of the die and abruptly changing to a negative load (deceleration) which load decreases to zero at the closed position whereupon the reciprocation apparatus is required to supply a very sudden, large, positive, stress-closing force to the die and retain such load during injection and solidification of the casting metal. The reciprocation apparatus is also required to absorb (in a negative direction) this large stress-closing force when the die is relaxed. During the die-opening half of a cycle, the reciprocation apparatus is subjected to loads which are the reverse of the aforedescribed closing loads. Clearly the wear and tear on the reciprocation apparatus can be severely great and good reason exists for the massiveness and frequent breakdowns common in the prior art which were not afforded the benefits of the present invention.

It has been found, however, that the energy cam of the present invention will maintain the reciprocation apparatus for the movable die platen in a substantially force-balanced state during a platen reciprocation cycle. This result is accomplished by employing the cam and its spring-loaded cam follower to absorb energy during those parts of a casting cycle when excess energy is present, such as during relaxation of the die from its stress-closed position, and dispensing such accumulated energy during those parts of a casting cycle when "extra" energy is needed, such as during acceleration of the movable die platen.

Referring to FIG. 1 representative of a die casting machine including one embodiment of the present invention, power for driving the die platen reciprocation apparatus of the present invention is derived from a single motor 12 whose shaft is connected by a chain 17 and sprockets 18, 18' to an electric clutch and brake system 20 interposed within the length of a main drive shaft 19. This drive shaft terminates in a sprocket 14 around which is trained a chain 21, the chain also being trained around a second sprocket 22 keyed to a stub shaft 23 which in turn carries a worm 24. Accordingly, worm 24 is positively connected in driven relationship with motor 12 except as clutch 20 may be disengaged.

Worm 24 serves as the driving gear for a Geneva Cross mechanism indicated generally at 11. Specifically, worm 24 engages the cam gear 25 of the Geneva Cross mechanism such that revolution of worm 24 will rotate gear 25. Gear 25 is provided with two cam sections 26, 27 and two lugs 28, 29 for cooperatively engaging the cross 30 of the mechanism. Gear 25, its lugs 28, 29 and its cam sections 26, 27 are designed to impart periodic motion to the cross 30 of the mechanism. The periodic motion imparted to the cross 30 is further transferred by the cross to a shaft 31 to which the cross is keyed. Shaft 31 carries a sprocket 32 keyed thereto so that each movement of cross 30, effected by rotation of gear 25, results in a corresponding rotation of sprocket 32. This sprocket 32 is drivingly connected to a further sprocket 33 spaced apart from sprocket 32 and keyed to a further shaft 6. Sprocket 32 is chosen in this embodiment to be twice the diameter of sprocket 33 such that each rotation of sprocket 32 results in two rotations of sprocket 33 hence two rotations of shaft 6. There is provided on shaft 6 a crank arm 7 which is rotatable 360° with rotation of shaft 6. Crank arm 7 extends perpendicularly from shaft 6 and its outboard end receives, in pivotal connection, one end of a link 8. The other end of link 8 is pivotally connected to a ram 9 to one end of which is secured the movable die platen 10. Appropriate mounting means is provided for reciprocatably mounting this ram.

During each reciprocation cycle of the die platen, it may be visualized that worm 24 rotates gear 25 one revolution. For each such one revolution there occurs two equal periodic rotational movements of cross 30. Each of these equal movements results in one quarter turn of cross 30, the cross being stationary during all other times of the reciprocation cycle. From FIG. 1 it can be visualized that each one quarter turn of cross 30 results in a one quarter turn of sprocket 32. By virtue of the size relationship between sprocket 32 and 33, each one quarter rotation of sprocket 32 results in one-half rotation of sprocket 33, hence a one-half rotation of shaft 6 and movement of arm 7 through an arc of 180°. Each 180° movement of arm 7 moves ram 9 through one-half of a reciprocation cycle. That is, for each one quarter turn of cross 30 there occurs movement of die platen 10 from a position fully closed to fully opened or from fully opened to fully closed, as the case may be.

In FIG. 2, cam 38 is shown as contoured for one typical casting cycle. In the depicted embodiment, the cam surface 41 is of generally elliptical geometry. At one apex of the ellipse, there is provided a notch 42 including within its extent about 16° of the cam circumference. Accordingly, the cam follower 39 abruptly enters the notch and equally abruptly exits the same as the cam rotates. Of course, while the follower resides in the notch, it neither imparts energy to nor absorbs energy from the cam. In Position 1 of FIG. 4, the cam follower resides in notch 42 and the die platen is in its stressed-closed position. In the stress-closed position of the die platen, the die is not merely in contact with the other die section or sections as the case may be. Rather, the die is in a compressed state and the framework of the diecasting machine is also stressed, i.e. there is a large quantity of energy stored in the die and its supporting structural framework. Heretofore, upon movement of the die from its stress-closed position toward its open position, this stored energy was necessarily assumed by the die reciprocation apparatus. In the present invention, this stored energy is absorbed by the spring 40 associated with the cam follower. This result is accomplished by the follower moving out of the notch 42 and compressing the spring as the die is relaxed from its stressed-closed position and is depicted by the "negative" (indicative of die opening) curve between 67½° and 150½° in FIG. 4.

As shown in FIG. 4, the energy absorbed in spring 40 is returned to the system as the die platen moves halfway (Position IV) toward its open position (Position VI). This return of energy enables the die reciprocation apparatus to overcome the inertia of the apparatus components and accelerate halfway between its closed and open positions. It is noted that the energy dispensed by the spring increases immediately upon the die leaving its closed position, achieves a maximum and becomes less as the platen progresses along its cycle, becoming minimum at the aforesaid halfway point. At this halfway point, the elliptical cam and its follower cause the spring to commence absorbing energy with resultant deceleration of the die platen, rapidly at first but decreasing to minimum deceleration as the platen achieves its fully open position.

In the present figures, there is provided a dwell time when the platen is in its fully open position. Position VI of FIG. 3 depicts the follower at the unnotched apex 43 of the elliptical cam where it will be observed that continuous rotation of the cam would result in immediate changeover of the spring from energy accumulation to energy dispensation so as to speed the platen from its open position toward its closed position and reduce the total casting cycle time. During the closing half of a casting cycle, the pattern of energy control by the spring is repeated as for the opening half of the cycle (see Positions VI–X and I, FIG. 5). In FIGS. 3–5, die-platen-closing forces are depicted as "positive" to indicate that they are "opposite" to the "negative" opening forces.

In a typical casting cycle, the platen makes contact with the stationary die platens about 8° prior to the end of a platen reciprocation cycle. At this point, there is needed a large and sudden force to stress-close the die. In the present invention, this force is supplied by spring 40 moving into notch 42 thereby in a brief span of time imparting a large quantity of energy to the apparatus as is depicted in FIG. 5.

When a powerful prime mover is imparting large quantities of energy to a mechanical system, any severance of the connection such as disengaging a clutch to separate the prime mover from its load, results in severe stresses, i.e., shock, within the mechanical apparatus, especially if the apparatus must be braked. Because the die reciprocation apparatus of the present invention is in a force-balanced state, it may be disconnected at any point during the cycle from the prime mover without introducing abrupt force imbalances which exert great strain and wear upon the apparatus. This capability provides the further benefit of fine control of the movement (or nonmovement) of the die reciprocation apparatus. That is, because the apparatus is maintained in a balanced state, it may be stopped or put in motion with only a very small force which results in a fine degree of controllability.

Specific embodiments of the several elements of apparatus of this invention have been given for purposes of illustrating and explaining the invention but such are not intended to limit the invention except as set forth in the claims.

What is claimed is:

1. In a method for diecasting employing a multisectional die, at least one section of which is reciprocatable between open and closed positions by means of mechanical apparatus interposed between said reciprocatable die section and a prime mover, the improved step comprising maintaining said mechanical reciprocation apparatus in a substantially force-balanced state during the major part of a reciprocation cycle.